United States Patent
Daviau (10) Patent No.: US 12,423,354 B2
(45) Date of Patent: Sep. 23, 2025

(54) OPTIMIZING TEXT FILTERING QUERIES ON GRAPH DATA

(71) Applicant: DASSAULT SYSTEMES, Velizy Villacoublay (FR)

(72) Inventor: François Daviau, Vélizy-villacoublay (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 0 days.

(21) Appl. No.: 18/542,207

(22) Filed: Dec. 15, 2023

(65) Prior Publication Data
US 2024/0202244 A1 Jun. 20, 2024

(30) Foreign Application Priority Data
Dec. 15, 2022 (EP) .................................. 22306881

(51) Int. Cl.
*G06F 3/06* (2006.01)
*G06F 16/2453* (2019.01)
*G06F 16/901* (2019.01)
*G06F 16/9035* (2019.01)

(52) U.S. Cl.
CPC .......... *G06F 16/9024* (2019.01); *G06F 3/064* (2013.01); *G06F 16/2453* (2019.01); *G06F 16/9035* (2019.01)

(58) Field of Classification Search
CPC ............... G06F 16/9024; G06F 3/064; G06F 16/2453; G06F 16/9035; G06F 16/2246; G06F 16/319; G06F 16/335; G06F 16/31
See application file for complete search history.

(56) References Cited

U.S. PATENT DOCUMENTS

| 9,626,401 B1* | 4/2017 | Ward .................. G06F 16/2453 |
| 2011/0078166 A1* | 3/2011 | Oliver .................. G06F 16/953 707/769 |
| 2012/0102472 A1* | 4/2012 | Wu ........................ G06F 8/434 717/137 |
| 2016/0070734 A1 | 3/2016 | Popov |

(Continued)

OTHER PUBLICATIONS

Cox, Russ, "Regular Expression Matching with a Trigram Index or How Google Code Search Worked", URL: https://swtch.com/~rsc/regexp/regexp4.html, Jan. 2012.

(Continued)

*Primary Examiner* — Jorge A Casanova
(74) *Attorney, Agent, or Firm* — Oblon, McClelland, Maier &Neustadt, L.L.P.

(57) ABSTRACT

A computer-implemented method for updating one or more inversed lists of a read/write graph database, each inversed list being associated with a trigram comprised in a literal value. The method including obtaining the dictionary encoder including a set of literal values and a set of IDs, each literal value being associated with an ID. The method further includes, for each literal value, identifying trigrams composing the literal value. The method further includes, for each identified trigram, and in a first data structure, updating a header of the inversed list associated with the identified trigram, and updating a designated block which includes a representation of the ID of the literal value including the trigram, thereby updating the inversed list associated to the identified trigram.

20 Claims, 3 Drawing Sheets

(56) References Cited

U.S. PATENT DOCUMENTS

| | | | |
|---|---|---|---|
| 2016/0092554 A1* | 3/2016 | Srinivasan | G06F 16/9024 707/798 |
| 2018/0089331 A1* | 3/2018 | Long | G06F 16/2455 |
| 2019/0138639 A1* | 5/2019 | Pal | G06F 16/211 |
| 2019/0317940 A1* | 10/2019 | Bauer | G06F 17/11 |
| 2021/0117868 A1* | 4/2021 | Sriharsha | G06F 16/24568 |
| 2023/0195725 A1* | 6/2023 | Labbate | G06F 16/80 707/715 |

OTHER PUBLICATIONS

PostgreSQL Trigram index documentation, https://www.postgresql.org/docs/current/pgtrom.html (2023).

Eric W. Brown, James P. Callan, W. Bruce Croft, "Fast Incremental Indexing for Full-Text Information Retrieval" in Proceedings of the 20th VLDB Conference, 1994.

Jianguo Wang, Chunbin Lin, Yannis Papakonstantinou, "An Experimental Study of Bitmap Compression vs. Inverted List Compression" SIGMOD 2017.

V. N. Anh and A. Moffat."Inverted index Compression Using Word-Aligned Binary Codes". IR, 8(1):151-166, 2005.

Microsoft Academic Knowledge Graph. Retrieved May 10, 2022, from https://makg.org/rdf-dumps.

"RDF 1.1 Concepts and Abstract Syntax", W3C Recommendation Feb. 25, 2014.

"RDF 1.1 N-Quads, A line-based syntax for RDF datasets", W3C Recommendation Feb. 25, 2014.

"SPARQL Query Language for RDF" https://www.w3.org/TR/rdf-sparql-query/ (2008).

"Dictionary Coder" https://en.wikipedia.org/wiki/Dictionary_coder (2023).

http://www.w3.org/1999/02/22-rdf-syntax-ns# (2023).

http://www.w3.org/2000/01/rdf-schema# (2023).

Extended European Search Report issued Apr. 28, 2023 in European Application No. EP22306881.8.

Lee, Jinsoo et al. "Processing SPARQL queries with regular expressions in RDF databases" BMC Bioinformatics 12 (2010): S6-S6.

Anonymous: "n-gram—Wikipedia", Oct. 5, 2022 (Oct. 5, 2022), XP093288625, Retrieved from the Internet: URL:https://en.wikipedia.org/w/index.php?title=N-gram&oldid=1114239819. (10 pages).

Office Action dated Jun. 30, 2025, issued in counterpart EP Application No. 22306881.8, (11 pages).

* cited by examiner

OPTIMIZING TEXT FILTERING QUERIES ON GRAPH DATA

CROSS REFERENCE TO RELATED APPLICATIONS

This application claims priority under 35 U.S.C. § 119 or 365 European Application No. 22306881.8 filed Dec. 15, 2022. The entire contents of the above application are incorporated herein by reference.

TECHNICAL FIELD

The disclosure relates to the field of computer programs and systems, and more specifically to a method, system and program for updating one or more inversed lists identifying literal values of a dictionary encoder of a read/write graph database.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Furthermore, a number of solutions for database management are offered for application of the above design systems and programs In-memory databases, i.e., purpose-built databases that rely primarily on memory for data storage, in contrast to databases that store data on disk or SSDs. Among such database management solutions, the solutions related to graph databases, for example RDF graph database, are of particular interest due to their great flexibility in data modeling and data storage. In general applications, RDF graph databases need to be capable of handling large datasets of millions to billions of tuples and in size of terabytes (e.g., Microsoft Academic Knowledge Graph. Retrieved May 10, 2022, from makg.org/rdf-dumps with over 8 billion triples requiring 1.2 TB of storage in the standard TTL format). These large datasets may in particular include historical data relevant to past states of the database, for example the history of modifications applied to an object being designed in a CAD design process. Storing such historical data in a database requires the support of incremental update by a data storage method used on the database. In applications, Such databases should also be equipped with efficient indexing strategy and invert list compression while providing the support of filtering and expression matching, for example for literal value stored in the database.

Known solutions in the prior art to execute regular expression matching on indexed data is, for example, disclosed in online documents Russ, "Regular Expression Matching with a Trigram Index or How Google Code Search Worked", swtch.com/~rsc/regexp/regexp4.html, January 2012, or www.postgresql.org/docs/current/pgtrgm.html. Such solutions use extraction of trigrams from the data and the storage for each trigram of inverted lists of data containing the trigram.

Known solutions in the prior art are also directed to growing size of inverted lists upon being updated.

Document Brown et al., "Fast Incremental Indexing for Full-Text Information Retrieval", In Proceedings of the 20th VLDB Conference, 1994, discloses a full-text information retrieval system which provides support for adding new documents to an existing document collection without re-indexing the entire collection. The information retrieval system uses a traditional inverted file index built on top of a persistent object store.

Document Wang et al., "An Experimental Study of Bitmap Compression vs. Inverted List Compression", SIGMOD, 2017 presents a comprehensive experimental study to compare a series of 9 bitmap compression methods and 12 inverted list compression methods. These 21 algorithms are experimented on synthetic datasets with different distributions (uniform, Zipf, and Markov) as well as 8 real-life datasets in terms of the space overhead, decompression time, intersection time, and union time.

Within this context, there is still a need for an improved method for updating one or more inversed lists identifying literal values of a dictionary encoder of a read/write database.

SUMMARY

It is therefore provided computer-implemented method for updating one or more inversed lists of a read/write graph database, each inversed list being associated with a trigram comprised in a literal value. The method comprises providing the dictionary encoder comprising a set of literal values and a set of IDs, each literal value being associated with an ID. The method further comprises, for each literal value, identifying trigrams composing the literal value. The method further comprises, for each identified trigram, and in a first data structure, updating a header of the inversed list associated with the identified trigram, and updating a designated block which comprises a representation of the ID of the literal value comprising the trigram, thereby updating the inversed list associated to the identified trigram.

The method may comprise one or more of the following:
  the method further comprising, upon meeting a criterion updating a representation of the ID of the literal value in a second data structure, the second data structure being associated with the header; and initializing the designated block;
  the criterion is met when the designated block is full;
  the second data structure is a tree, and the method further comprises, upon the updating of the representation of the ID of the literal value in a second data structure updating a root address of the tree in the header;

the second data structure is a tree, the updates representation of the ID of the literal value in the second data structure comprising one or more blocks, each block being a set of eight 32-bit words;

wherein the first data structure is any associative data structure, preferably a tree;

the first data structure being a B+Tree, wherein the updating of a representation of the ID of the literal value comprises updating a reference of the ID in an internal node of the B+Tree, and updating the ID in a leaf of the B+Tree;

the designated block of the first data structure is a set of eight 32-bit words;

each of the eight 32-bit words is configured according to one of the following patterns 16×2 bits integers, 8×3 bits then 2×4 bits, 2×4 bits then 8×3 bits, 8×4 bits, 4×5 bits then 2×6 bits, 2×6 bits then 4×5 bits, 3×6 bits then 2×7 bits, 2×7 bits then 3×6 bits, 4×8 bits, 1×10 bits then 2×11 bits, 2×11 bits then 1×10 bits, 1×8 bits then 1×24 bits, 2×16 bits, 1×24 bits then 1×8 bits, or 1×32 bits;

a first word of the set comprises data of one or more of the followings: an indicator if the designated block is full or not, an indicator of a next word to be filled, and/or an indicator of a pattern for each word; and/or the added representation of the ID of the literal value indicates a difference between a first ID of a first literal value comprising the identified trigram, and a second ID of a second literal value comprising the identified trigram.

It is further provided a method of answering a query using the updated inversed lists according to the method (of updating inversed lists) discussed above. The method of answering a query comprises obtaining a query by a query engine, the query containing at least one filter for a literal value. The method further comprises obtaining one or more updated inversed lists, the one or more obtained inversed lists being associated to respective one or more trigrams composing the literal value of the filter; and answering the obtained query using a subset of the one or more obtained inversed lists.

The method of answering a query may comprise the following:

the subset of the one more of the one or more obtained inversed lists are a subset of a minimal cardinality among the one or more obtained inversed lists.

It is further provided a computer program comprising instructions for performing the method.

It is further provided a computer readable storage medium having recorded thereon the computer program.

It is further provided a system comprising a processor coupled to a memory and, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
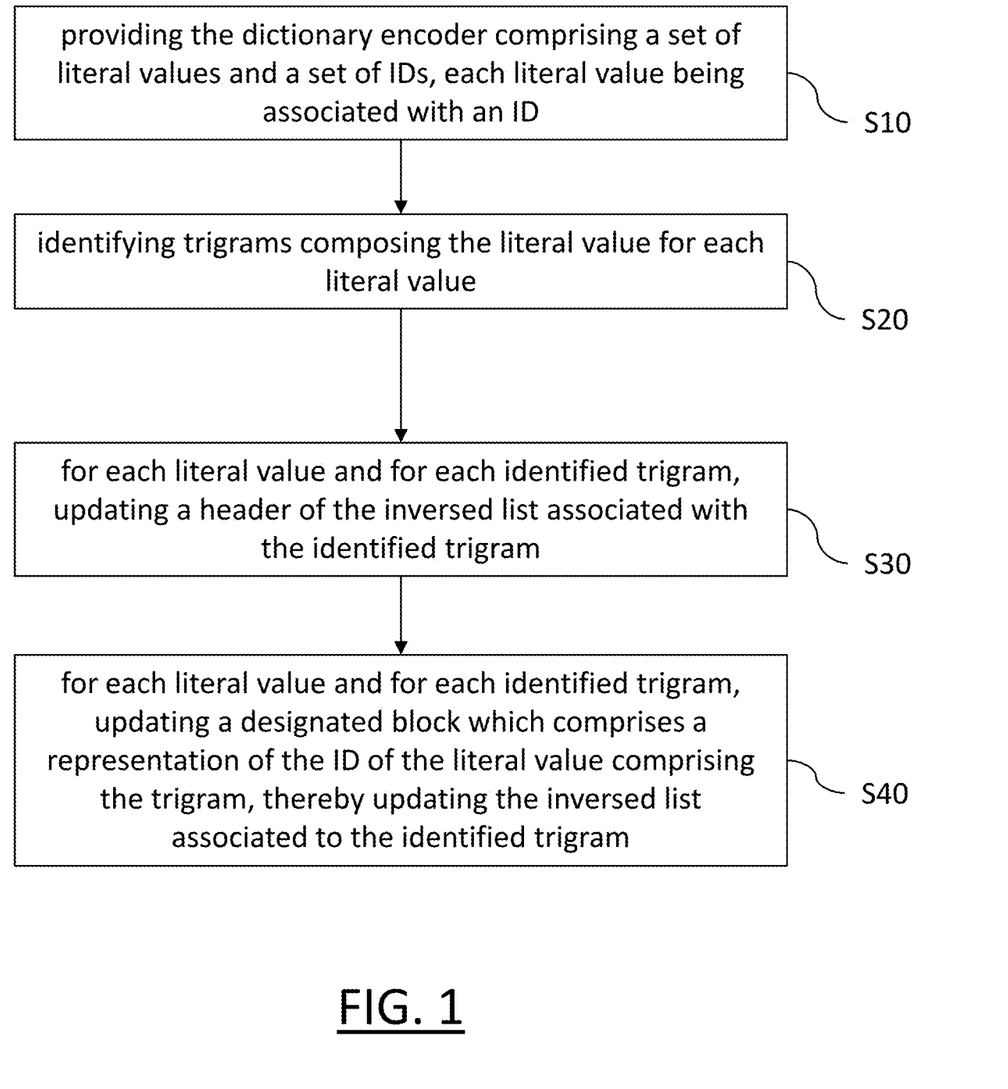
FIG. 1 shows a flowchart of an example of the method.

With reference to the flowchart of FIG. 1, described is a computer-implemented method for updating (one or more or all) inversed list(s) of a read/write graph database. The inversed lists identify literal values of a dictionary encoder of a read/write database. Each inversed list is associated to a trigram comprised in a literal value. The method comprises providing the dictionary encoder comprising a set of literal values and a set of IDs where each literal value (of the set of literal values) is associated with an ID (of the set of IDs). The method then comprises, for each literal value, identifying trigrams composing the literal value. For each identified trigram, and in a first data structure, the method comprises updating a header of the inversed list associated with the identified trigram, and updating a designated block. The designated block comprises a representation of the ID of the literal value comprising the trigram. Thereby the method updates an inverse list associated to the identified trigram.

As known per se a "dictionary encoder" for a graph database is a mapping, i.e., an encoding or an indexing, which maps each stored ID in the database (e.g., IDs stored as RDF triples) to a respective content. A dictionary is used to provide indexes to RDF triples storage to help optimize the persistence of information which may be vastly repetitive. Specifically, by a "dictionary encoder for literal values of a database" it is meant a table which associates an ID stored in the database to a literal value. This enables optimization of the storage of literal values in a graph database.

As further known per se, an "inversed list" (or equivalently an inverted list) is a mapping from each content (e.g., a literal value) to each stored ID in the database. In other words, each entry in an inversed list corresponds to a content and maps said entry to a plurality of IDs stored in the database which comprise said content.

By "inversed lists identifying literal values of a dictionary encoder of a read/write database", it is meant a plurality of inversed lists which altogether defines the mapping for each literal value, thereby identify respective IDs for said literal value in the database. Specifically, each inversed list of said plurality is associated with a trigram of (i.e., comprised in) said literal value. A trigram of a literal value is composed of three (e.g., consequent) bytes of said literal value. By "identifying trigrams composing the literal value" is to split each literal value into a plurality of trigrams. In examples, said plurality may only have one trigram (e.g., when a literal value has only three characters/bytes).

By "a representation of the ID of the literal value comprising the trigram" it is thereby meant entries of an inverted index associated to the trigram. In other words, said representation is an ensemble of respective stored IDs of the literal values comprising the trigram.

By "updating an inversed list" it is meant creating the mapping between the content and the stored IDs in the database and/or adding a new association to an already existing inversed list. Such updating may be particularly needed when new data are inserted to a database.

The method thereby constitutes an improved solution for updating inversed lists identifying literal value of dictionary encoder as the method treats the literal values by their composing trigrams. In other words, the method updates inverse lists identifying literal values of a dictionary encoder by identifying the composing trigrams of each literal value and updating the inversed list associated to the identified trigram. This, in particular, optimizes application of filtering for a read query on the updated database as, by employing the updated inversed lists associated to composing trigrams, each filter is applied on one or more trigram patterns instead of a large pattern for a large literal value, thereby improving the filtering functionality of the query.

By "database" it is meant any collection of data (i.e., information) organized for search and retrieval (e.g., a graph-oriented database). As known in the art, a graph-oriented database is an object-oriented database using graph theory, therefore with nodes and arcs, allowing data to be represented and stored. The graph relates the data items in the store to a collection of nodes and edges, the edges representing the relationships between the nodes. The relationships allow data in the store to be linked together directly and, in many cases, retrieved with one operation. Graph databases hold the relationships between data as a priority; contrarily to other database models (e.g., relational databases) that link the data by implicit connections. When stored on a memory (e.g., a persistent memory), the graph database allows a rapid search and retrieval by a computer. Especially, graph databases are structured to for fast retrieval, modification, and deletion of relationships in conjunction with various data-processing operations. Graph-oriented database are also referred to as graph database; the expressions "graph-oriented database" and "graph database" are synonymous.

In examples, the graph database may be an RDF graph database. RDF graphs are a traditional data model used for the storage and the retrieving of graphs. RDF graph is a directed, labeled graph data format. Such format is widely used for representing information in the Web. A standard specification has been published by W3C to specify RDF representation of information as graphs, see for example "RDF 1.1 Concepts and Abstract Syntax", W3C Recommendation 25 Feb. 2014 (or additionally the draft version RDF-star). An RDF graph database may have billions of tuples; for example the Uniprot dataset is a resource of protein sequence and functional information.

The core structure of the abstract syntax used is a set of tuples, each comprising a predicate. A set of such RDF tuples is called an RDF graph. There can be three kinds of nodes in an RDF graph: IRIs, literals, and blank nodes.

In examples, an RDF tuple may comprise three or four elements comprising nodes and edges. In examples, each RDF tuple (or elements of each RDF tuple) may be a triple comprising a subject, a predicate, and an object. In such examples, an RDF graph may be visualized as a node and a directed-arc diagram, in which each triple is represented as a node-arc-node link. Alternatively, an RDF triple may be visualized by two nodes, which are the subject and the object and an arc connecting them, which is the predicate.

In examples, the RDF tuple may be an RDF quad. An RDF quad may be obtained by adding a graph label to an RDF triple. In such examples, an RDF tuple includes the RDF graph. A standard specification has been published by W3C to specify RDF Quads (also referred to as N-Quads), see for example "RDF 1.1 N-Quads, A line-based syntax for RDF datasets", W3C Recommendation 25 Feb. 2014. An RDF quad may be obtained by adding a graph name to an RDF triple. A graph name may be either empty (i.e., for a default or unnamed graph) or an IRI (i.e., a graph IRI. In examples, a predicate of the graph may have a same IRI as the graph IRI. The graph name of each quad is the graph that the quad is part of in a respective RDF dataset. An RDF dataset, as known per se (e.g., see www.w3.org/TR/rdf-sparql-query/) represents a collection of graphs. Hereinafter, the term RDF tuple (or tuple) indifferently refers to an RDF triple or an RDF quad, unless the use of one or the other is explicitly mentioned.

Possible optimizations for a query engine of a graph database are impacted by the assumption that the graph database is interacting with an Open World or a Closed World. As known per se, in a formal system of logic used for knowledge representation, the open-world assumption (OWA) is the assumption that the truth value of a statement may be true irrespective of whether or not it is known to be true. It is the opposite of the closed-world assumption, which holds that any statement that is true is also known to be true. On the other hand, Closed World Systems require a place to put everything (e.g., slot on a frame, field on an OO class, or column in a DB). OWA assumes incomplete information by default which intentionally underspecifies and allows others to reuse and extend. Semantic Web is a vision of a computer-understandable web which is distributed knowledge and data in a reusable form and RDF, the W3C recommendation for the Semantic Web, follows the Open World Assumption. It allows a greater flexibility in data modeling and data storage. Yet the constraints of a Closed World Assumption, as in the relational model with SQL, are useful for query optimizations since they provide more information on how the data is stored. In examples, the query is a SPARQL query. SPARQL is the W3C recommendation for querying RDF data and is a graph-matching language built on top of patterns of RDF tuples. By a "pattern of RDF tuples" it is meant a pattern/template formed by an RDF graph. In other words, a pattern of RDF tuples is an RDF graph (i.e., a set of RDF triples) where subject, predicate, object, or label of the graph can be replaced by a variable (for a query). SPARQL is a query language for RDF data able to express queries across diverse data sources, whether the data is stored natively as RDF or viewed as RDF via middleware. SPARQL is mainly based on graph homomorphism. A graph homomorphism is a mapping between two graphs that respects their structure. More concretely, it is a function between the vertex sets of two graphs that maps adjacent vertices to adjacent vertices. Furthermore, SPARQL includes built-in functions to filter literals as a part of sub-graph extraction. The most general function predicate is a regular expression matching check.

SPARQL contains capabilities for querying required and optional graph patterns along with their conjunctions and disjunctions. SPARQL also supports aggregation, subqueries, negation, creating values by expressions, extensible value testing, and constraining queries by source RDF graph. This means SPARQL queries needs to answer to eight different triple patterns possible in the SPARQL. Such eight triple patterns include (S,P,O), (S,?P,O), (S,P,?O), (S,?P,?O), (?S,P,O), (?S,?P,O), (?S,P,?O), and (?S,?P,?O) in which variables are preceded in the pattern, by the symbol ?. Variables are the output of triple patterns and may be the output of the SPARQL query. In some examples, variables may be the output of a SELECT query. The output of a SPARQL query may be built using the variables (e.g., aggregators like summation). Variables in a query may be used to build a graph homomorphism (i.e., intermediary nodes necessary to get the result of the query). In some examples, variables in a query may be neither used for output nor intermediary result. A Basic Graph Pattern (BGP) may be one of the eight triple patterns explained above. Additionally, a BGP may be a quad pattern with additionally having the label of the graph as the query variable. In particular examples where the method obtains one or more adjacency matrices each as representations of groups of tuples, subject and object may be queried on one adjacency matrix. In other words, in these particular examples, the BGPs may be any of (S,O), (S,?O), (?S,O), and (?S,?O). SPARQL may build more complex queries by joining the result of several BGPs and possibly other operators. Thus, competitive SPARQL engines require, at least, fast triple pattern solution and efficient join methods. Additionally, query optimizers are required to build efficient execution plans that minimize the number of intermediate results to be joined in the BGP.

In examples, the graph database has an existing triple store. A triple store (also referred to as RDF store) is a purpose-built database for the storage and retrieval of triples through semantic queries, as known in the art. A triple store can at least answer to the eight basic triple patterns of SPARQL described above. It may also answer to filtering constraints (e.g., "x>5") along with the triples pattern. As known per se, a filtering constraint is a conditional clause that can be inserted into a query on a graph database (e.g., via SPARQL) to filter out the result of said query based on the satisfaction of said conditional clause. Such a triple store is considered to be the storage engine on which a SPARQL query is executed by a query engine. A storage engine (also called "database engine") is an underlying software component that a database management system (DBMS) uses to Create, Read, Update and Delete (CRUD) data from a database, as known in the art.

Back to FIG. 1, in step S10, the method comprises providing the dictionary encoder comprising a set of literal values and a set of IDs. By "providing the dictionary encoder" it is meant it is meant providing the dictionary encoder to the method, or equivalently, obtaining the dictionary encoder by the method. In examples, such an obtaining or providing may mean or comprise either downloading said dictionary encoder (e.g., from an online database, or an online cloud), or retrieving the dictionary encoder from a memory (e.g., a persistent memory).

In step S20, the method identifies (e.g., one or more) trigrams composing each literal value of the provided dictionary encoder. As discussed above, each trigram of a literal value is composed of three bytes of said literal value. In other words, trigrams are 3 bytes data. In examples, UTF-8 may be used to encode strings to be saves. According to the standard, in such examples, the code points use between 1 and 4 bytes (included) of storage. Thus, a trigram may be the last byte of a code point, and the first 2 bytes of the following code point. Upon performing step S20, the method obtains a plurality of trigrams for the literal values of the set.

In step S30, the method updates a header of the inversed list associated with the identified trigram in a first data structure. By a "header", it is meant a header of a respective inversed list. As known per se in information technology and computer science, it is meant supplemental data placed at the beginning of a block of data being stored or transmitted, here said inversed list. A header is a part of main data, here an inversed list, which carries metadata or other information necessary for processing the main data. In general, a header is placed before the actual data and marks the start of the actual data. The metadata of a header may comprise a size, a reference to the associated trigram, an address in which the next piece of information will be stored, a duplicate of the last stored element, and/or a timestamp of the latest modification of the inversed list. The size stored in the metadata of a header may comprise two sizes, an allocated size and a used size. By "updating a header of the inversed list" it is meant creating the header of the inversed list in a first data structure if the header for the trigram does not exist or alternatively updating the metadata of an already existing header for the trigram.

In step S40, the method updates a designated block which comprises a representation of the ID of the literal value comprising the trigram in a first data structure. By updating the designated block and thereby the inversed list associated to the identified trigram, the method updates an inversed list associated to the identified trigram. The method performs this for each composing trigrams of each literal value. By "updating a designated block which comprises a representation of the ID of the literal value" it is meant creating for the designated block a first data structure if the designated block does not exist or alternatively updating an already existing representation. The designated block is in association with the identified trigram and thereby the header.

In examples, the method performs the steps S20, S30, and S40, for one literal value after another, thereby the method updates the inversed lists for a dictionary encoder in a stepwise manner. Alliteratively, the method may perform steps S20, S30, and S40 for a batch of literal values. In other words, the method may provide a dictionary for a first batch of literal values, then identified a plurality of trigrams for all literal values in the first batch (i.e., step S20) and then performs the updates in step S30 and S40 for each trigram of the plurality.

Thereby, the method updates inversed lists identifying literal values of a dictionary encoder by updating respective header and designated blocks for each trigrams in a first data structure. The first data structure defines a data structure of storage on a persistent memory, thereby by "updating a header/block in first data structure" it is meant updating respective memory blocks in said persistent memory which is arranged according to the first data structure.

In examples, the first data structure is any associative data structure, preferably a tree. As known per se in the field of computer science, an associative data structure, for example an associative array, map, symbol table, or dictionary is an abstract data type that stores a collection of (key, value) or (ID, value) pairs such that each possible key/ID appears at most once in the collection. In general dictionary encoder forms an associative map of the couples (ID, "literal value"), and the method update another associative map of the inversed lists comprising the couples ("trigram", inversed list of IDs). Here the inversed list of IDs gathers a plurality of IDs in association with each trigram.

In examples, the first data structure may be a B+Tree. In such examples, the updating of a representation of the ID of the literal value comprises updating a reference (i.e., pointer) of the ID in an internal node of the B+Tree, and updating the ID in a leaf of the B+Tree. As known per se a B+Tree is an example of classic associative maps with tree-like structure in which the intermediate nodes of the tree do not contain values, and only contain keys and pointers. On the other hand, values are being kept in leaves of a B+Tree. In examples, the method may use each trigram as a key for an internal of the B+Tree of the first data structure and updates a reference in said internal node. The updated reference in an internal node may point to a leaf of the B+Tree, which is configured to store the values, i.e., the inversed list for said trigram. The updated reference in an internal node may additionally point to children nodes of said node. The method updates the values by updating the ID in a leaf of the B+Tree. By updating a reference/it is meant adding the refence/ID if the reference/ID does not exist.

In examples, the header and the designated block may be of a fixed size. By "a header/designated block of a fixed size" it is meant that a size of the header (i.e., the size of the metadate) or respectively a size of the designated block is not subject to change, upon an update of the header and/or the actual data. Such examples are particularly efficient when the first data structure is a B+Tree as a B+Tree is particularly efficient with fixed size values. This enables the method to use the header and the designated block which are a fixed size as fixed size values in the leaves of the B+Tree.

In examples, the designated block of the first data structure may be a set of eight 32-bit words. Thereby, the size of the designated block is 32 bytes (i.e., 256 bits) according to such examples. Alternatively, the designated block of the first data structure may comprise a set of nine 28-bit words while the designated blow being of 32-byte size. Yet alternatively, the designated block of the first data structure may comprise a set of eight 64-bit words while the designated blow being of 64-byte size. In preferred examples of the method, however, the first data structure may be the set of eight 32-bit words as discussed, as 28-bits indices are incompatible with the inMemory Graph Database which uses 32 bits integers as literal indexes. Furthermore, using 64-bits indices wastes storage space when applied to 32 bits integers as inMemory Graph Database. Such a choice, i.e., a set of eight 32-bit words or a 32-byte block, further constitutes an improved solution as the block is small enough that it is entirely in a cache line (which is 64 bytes for the current state of the art processors)), thereby provides a cache-friendly method for updating the inversed lists and answering received queries using said inversed list. In such preferred examples, the method may update the designated block by updating the set of eight words from the first word to the eights one.

In examples, each of the eight 32-bit words discussed above may be configured according to one of the following (sixteen) patterns 16×2 bits integers, 8×3 bits then 2×4 bits, 2×4 bits then 8×3 bits, 8×4 bits, 4×5 bits then 2×6 bits, 2×6 bits then 4×5 bits, 3×6 bits then 2×7 bits, 2×7 bits then 3×6 bits, 4×8 bits, 1×10 bits then 2×11 bits, 2×11 bits then 1×10 bits, 1×8 bits then 1×24 bits, 2×16 bits, 1×24 bits then 1×8 bits, or 1×32 bits. Each of these patters defines how a 32-bit word in the designated block may be filled by one or more integers. The method may alternatively use any other patterns that fills a 32-bit word. Each of the patterns may be equivalently called a compression pattern.

In examples, the method may determine a different pattern for each 32-bit word of the set. The method may determine said pattern automatically and/or according to one or more pre-defined rules, and/or regarding to the size of the data (e.g., ID) to be stored. For example, the method may order patterns in a table which attributes a value for each pattern in association with said pattern. The attributed value may be equivalently called selector. The method then may, for each word 25 choose the first selector in the table which matches the size of the data to be stored.

In examples, a first word of the set (of eight words) comprises (meta)data of one or more of the followings: an indicator if the designated block is full or not, an indicator of a next word to be filled, and/or an indicator of a pattern for each word. In such examples, the filling pattern of the first word may be different from the patterns listed in the table while the remaining seven words are filled according to a pattern listed in the table. The indicator if the designated block is full or not may be the first 1 bits of information of the first word with a first value (e.g., 0) when the block is not filled and a second value (e.g., 1) when the block is filled. This improves the method to rapidly (i.e., only by reading the first bit of the set) determines if new data can be stored in the designated block. an indicator of a next word to be filled may be an integer referring that the next free word of the designated block. The indicator of a pattern for each word may be a selector as discussed above. This improves the compression of the data (e.g., ID) stored in the block, as the metadata of the first word defines the compression pattern for the other seven words using the selector table and further guides the method in updating the designated block.

In examples, the added representation of the ID of the literal value comprises respective ID of the literal value in the provided dictionary. Alternatively, the added representation of the ID of the literal value indicates a difference between a first ID of a first literal value comprising the identified trigram, and a second ID of a second literal value comprising the identified trigram. In such examples, the method stores a difference (i.e., delta) between any two consecutive IDs. The method may store the ID of the literal value in the provided dictionary for the first word. This constitutes an improved solution as storing the differences require less bits to be used.

In examples, the method may further comprise, upon meeting a criterion, updating a representation of the ID of the literal value in a second data structure, and initializing the designated block. The second data structure may be associated with the header (or equivalently the full header). Alternatively or additionally, the first data structure, e.g., in the updated here may have a pointer to the associated second data structure. Thereby, for each trigram, the respective first data structure and the respective second data structure are in mutual association. In examples, such a mutual association may be obtained as the header (of the first data structure) by comprising references to offsets (i.e., memory addresses) of the second data structure while the method ensures that there are not any two headers referencing the same place in the second data structure.

By "updating a representation of the ID of the literal value in a second data structure" it is meant creating a second data structure which comprise a representation of the ID of the literal value or alternatively updating an already existing representation. In examples, the method may update representation of the ID in a second data structure by pushing (i.e., duplicating) the updated designated block of the first data structure when the criterion is met. In examples the method may initialize the designated block by setting it to a default value (e.g., 0), or alternatively free the respective memory attributed to it.

In examples, the criterion is met when the designated block of the header is full. In other words, the method updates the designated block in the first data structure till it gets full, then pushes the content of the designated block to an associated second data structure and initializes the designated block. The method may store the second data structure in a memory, the so-called "secondary area". In this terminology the designated block of the first data structure may be called "working area" as the method firstly updates the representations of IDs on a smaller (and may be of fixed size) working area. Such examples are in particular efficient when the first data structure is a B+Tree that stores fixed size value in the leaves (where the header and the designated block are of a fixed size) or a linked list. In general, an inversed list has a value of variant size (e.g., in a write database) where new literal values may be added to the database and thereby the provided dictionary encoder. The method constitutes an improved solution via enabling using B+Trees, by separating an inversed list of a variable size to a respective first data structure of a fixed size (i.e., the header and the designated block of a fixed size) and a variable size second data structure in the secondary area in reference to the header.

In examples, the second data structure may be a tree. In such examples, the method further comprises, upon the updating of the representation of the ID of the literal value in a second data structure, updating a root address of the tree in the header. The root address is configured to make a reference to the memory address of the second data structure.

Furthermore, in examples where the second data structure is a tree, the added representation of the ID of the literal value in the second data structure may comprise one or more blocks, each being a set of eight 32-bit words. In such examples, each block may be a memory block for a node of the tree of the second data structure. Alternatively, the second data structure may be a B+Tree in which the values (i.e., the blocks) are only saved on the leaves of the tree. The fact that each block may be a set of eight 32-bit words (thereby, each block being a 32-byte block) constitutes a particularly efficient solution in combination of examples when the designated block comprising a set of eight 32-bit words as said designated block can perfectly fit a block of the second data structure upon being pushed. The second data structure thereby may be written block by block and in pages wherein each page comprises one or more blocks. The number of blocks in a tree node may be fixed at the time of creation and may be supposed to be a power of 2, between 1 and the ratio of a page size by a block size. A page may thus contain a fixed number of nodes, and each node may be stored on a single page.

The disclosure is also related to a method of answering a query using the updated inversed lists according to the method discussed hereinabove. The method of answering a query comprises obtaining a query by a query engine. The query contains at least one filter for a literal value. The method then obtains one or more updated inversed lists. The method may obtain (i.e., provide) the one or more updated inversed via an online cloud or by accessing a local memory. The one or more obtained inversed lists are associated to respective one or more trigrams composing the literal value of the filter. The method then answers the obtained query using a subset of the one or more obtained inversed lists. This constitutes an improved solution as the algorithmic complexity for answering the query is linear with respect to the size of the dataset (for which the dictionary encoder is provided). Furthermore, the usage of inverse list of trigrams helps lowering the CPU resource consumption when running SPARQL queries with string filtering aspects (up to a 1000× factor).

In examples, the subset of the one more of the one or more obtained inversed lists are a subset of a minimal cardinality among the one or more obtained inversed lists. This improves the efficiency of the query answering method as the method answer the query on the smallest subset.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 2:
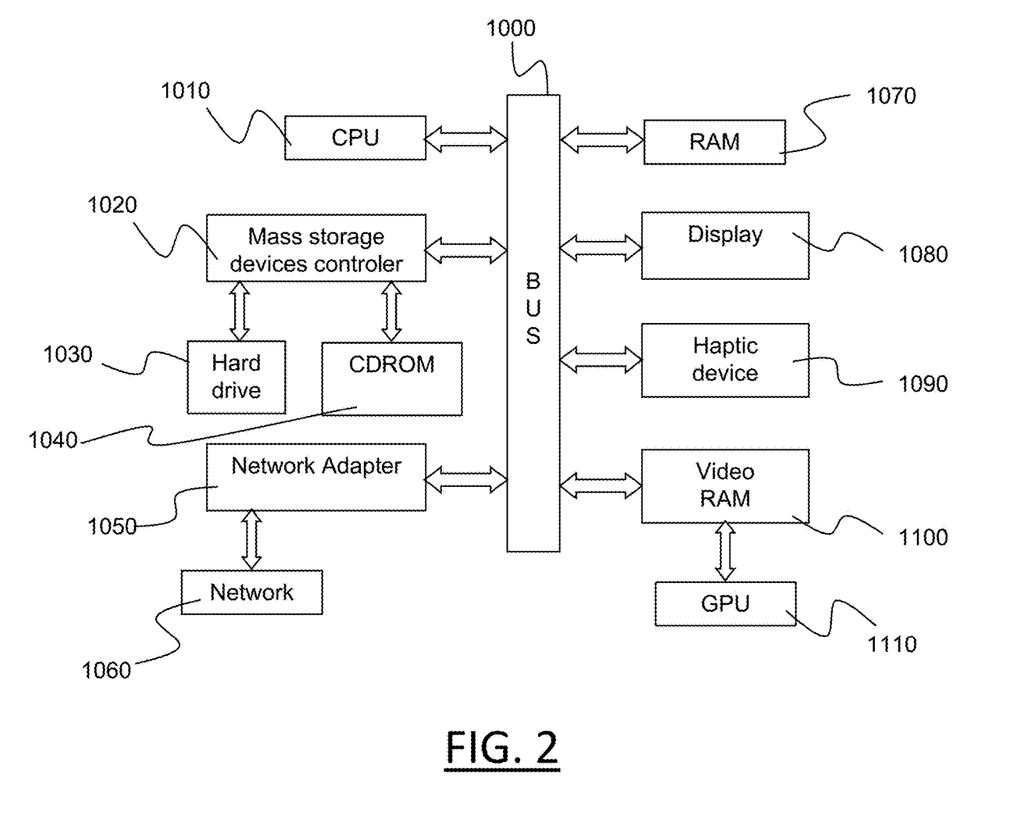
FIG. 2 shows an example of the system.

FIG. 2 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

Examples of implementations of the hereinabove discussed examples of the method are now discussed.

The implementations are related to graph databases. In particular, the technical field in which the implementations realize is how a graph database index the literal nodes of a graph data in order to optimize execution of SPARQL queries using such built-in filters. More specifically, the implementations are related to indexing techniques of the general field of integer sequence compression techniques (as, e.g., discussed in Document Wang et al., "An Experimental Study of Bitmap Compression vs. Inverted List Compression", SIGMOD 2017, and Anh and Moffat, "Inverted index compression using word-aligned binary codes", Information Retrieval, 8(1):151-166, 2005.) and application such techniques to graph databases and RDF data.

The implementations are further related to inMemory Graph Database, i.e., an RDF database which allows modifying queries and read queries, and have the capability to run read queries on past state of the database. Thereby the indexing structure of the implementations supports incremental update, and minimizes the size of an update of a database state. In particular, the implementations may be related to optimize literal value queries on append-only databases where no entry is removed, thereby the size of the database is strictly increasing over time.

In order to be able to execute regular expression matching on indexed data, the state of the art is using the extraction of trigrams from the data, and the storage for each trigram of the inverted list of data containing the trigram. The problems faced when index need to be updated limit further development as the case of growing indexes and no suppression requires the ability to grow inverted lists. For inverted list stored inside the database, the underlying file structure need to provide this growing capability with good performances, in particular for historical graph database and without resulting write amplification due to the update of linked lists, and the complexity of the allocation.

Thereby, the implementations are directed to a space-efficient indexation of RDF Literals, allowing optimized filtering with regular expressions (e.g., contains), and compatible with the use of 32 bits integers as literal identifiers in an append-only database. Such an indexation allows fast retrieval, and efficient incremental updates in terms of disk space by reducing write amplification.

The implementations introduce an indexing method called SimpleBlock16 and takes place in the general field of integer sequence compression. As discussed in more details below, the implementations introduce a compression schema using blocks of eight 32-bit words. The implementations use the first word to store seven 4 bits values called selectors hereafter, and store as many small integers as possible in the next seven words, each depending on the corresponding selector. Depending on the selector, the word may store one 32 bits integer, or two 16 bits integers, or four 8 bits integers, etc. As each selector takes 4 bits, there are 16 possibilities. The details of the selectors are explained below.

The graph database maintains an index of all literals that contains each trigram. The primary data structure is a classical B+Tree with trigrams as keys, and as value the inverted list, containing a header and a block called the working area. This working area actually contains the last integers of the inverted list. When the working area is full for the growing inverted list, the implementations push the block in a file called secondary area, with references to the offsets in the file stored in by the header.

The 32 bytes block used in the implementations is small enough to be entirely fitted in a cache line (64 bytes), so compression and decompression is cache friendly. On an update of moderate size (1 MB to 10 MB turtle file), the experiments show that the B+Tree is often almost fully rewritten, as many trigrams need to update their inverted list, but the working area avoids amplifying the write on the secondary file area, written block by block in pages. Such an improvement in avoiding write amplification is also based on the fact that the presence of the working area helps to reduce the need to write (i.e., update) the secondary file. This is the case for rare trigrams where the changes in the inverse list are small in size, thus only the full header is modified. For more frequent trigrams where the changes in the inverse list are larger in size, because new modifications are written block by block in the secondary file in pages, once a page is full of written blocks, it never changes. This helps avoiding rewriting pages too often.

The implementations provide an improved solution by using of inverse list of trigrams which helps lowering the CPU resource consumption when running SPARQL queries with string filtering aspects, up to a 1000× factor. Furthermore, the specific compression scheme of the implementations ensures the data structure inside the graph database does not lead to write amplification problems.

The implementations of SimpleBlock16 compression methods packs as many integers as possible in a block of 8 32 bits integers. The first element of the block is called the selector table, the following seven integers contain the compressed data.

As obtaining zero-ed memory is the simplest allocation method on most operating systems (OSs), the implementations ensures that an empty integer list is represented by a block of 8 zero during an initialization.

The implementations provide a method to test whether the block is full, a method to add data (e.g., integers) provided that there is room for it in the block. The implementations may further provide a method to retrieve the data (e.g., integers) added in the block, their count and their values.

The implementations implement in a InMemory Graph Database compression scheme based on dictionary encoding (en.wikipedia.org/wiki/Dictionary_coder) to transform string values (of literals) into 32-bit integers called indexes. The dictionary in itself may be obtained by any methods in the art, for example with B+Trees.

Furthermore, on the dictionary level, the implementations provide a method to get all literal indexes containing a given trigram, and a method which for a set expression on trigrams gets all literal indexes matching the expression, for example of a set expression ('abc' AND 'bcd') OR ('ABD'). The latter method may be based on former method.

Compression Method

The implementation may use a table which describes how each selector drives the decompression. An example of such tables is Table 1 below.

TABLE 1

| Selector value | Compression case |
|---|---|
| 0 | # of successive integers |
| 1 | 16 × 2 bits integers |
| 2 | 8 × 3 bits then 2 × 4 bits |
| 3 | 2 × 4 bits then 8 × 3 bits |
| 4 | 8 × 4 bits |

TABLE 1-continued

| Selector value | Compression case |
| --- | --- |
| 5 | 4 × 5 bits then 2 × 6 bits |
| 6 | 2 × 6 bits then 4 × 5 bits |
| 7 | 3 × 6 bits then 2 × 7 bits |
| 8 | 2 × 7 bits then 3 × 6 bits |
| 9 | 4 × 8 bits |
| 10 | 1 × 10 bits then 2 × 11 bits |
| 11 | 2 × 11 bits then 1 × 10 bits |
| 12 | 1 × 8 bits then 1 × 24 bits |
| 13 | 2 × 16 bits |
| 14 | 1 × 24 bits then 1 × 8 bits |
| 15 | 1 × 32 bits |

The implementation of compression and decompression follow the same algorithms as Simple9 method (according to Document Anh and Moffat, "Inverted index compression using word-aligned binary codes", Information Retrieval, 8(1): 151-166, 2005, which is incorporated herein by reference). but with a different selector table. The implementations store the selector in the first integer and not inside the integer. This means the block has to keep track of which integer is writable, and that information is stored in the last available 4 bits of the selector.

The dictionary for the implementations reserves indexes in a strictly growing pattern, therefor the implementations store in the inverse list for a trigram the deltas between indexes of literals containing the trigrams. On extremely rare trigrams, the implementations may store values requiring more than 28 bits. Table 2 demonstrates an example of how the implementation ensures that 32-bit values are stored.

TABLE 2

| Selector table | 0'011'0011'1010'0000'0000'0000'0000'0000 | 3, 3, 10, 0, 0, 0, 0, 0 |
| --- | --- | --- |
| Word1 | 1010'0010'011'000'000'000'000'000'000'000 | 10, 2, 3, 0, 0, 0, 0, 0, 0, 0 |
| Word 2 | 0110101001'00000001001'10001001101 | 425, 9, 1101 |
| Word 3 | 0 | |
| Word 4 | 0 | |
| Word 5 | 0 | |
| Word 6 | 0 | |
| Word 7 | 0 | |

For example, suppose that the implementations have to store the indexes 10, 12, 15, 440, 449, and 1550. Therefore, the deltas are 10, 2, 3, 425, 9, and 1101. The first integer insertion (10) requires 4 bits and the first selector that accepts 4 bits number is 3, so the selector 3 (according to Table 1) is used. Then 2 and 3 are accepted in the same integer and with the selector 3. For 425, the insertion needs 10 bits, there is no solution to store the 4 integers in a single integer according to the selector table (Table 1), so the implementations allow the first integer of the block with the first 3, and put 425 in the second integer, with selector 10 which is the first one that allows a 10-bit integer. Then, for deltas 9 and 1101, that both fit in the 11 bits the implementations choose selector 10 which finishes the second integer. The next integer would require the third integer, with a new choice of selector.

When the implementations fill all seven integers of the block, the block is full and there is a need to push the block to the secondary area. After the push, the block of the working area is reset to the initial value, before inserting the next integer into it.

The inverse list is conceptually a list of blocks, all full except the last one. The precise storage scheme of the blocks of an inverse list is detailed below.

Data Structures

In order to be able to list all indexes for a given trigram, the implementations use a data structure that associates trigrams to the data structure representing an inverse list. Such a data structure may be a B+Tree, but any associative data structure may be used here, with the usual trade-offs of memory usage versus CPU cost. The B+Tree may offer the capability to access stats on a range of trigrams, for evaluation of the cost of a regex like 'ab.' (the dot means any character). Other associative data 20) structure may offer faster access or update, without that capability.

For the inverse list, the implementations put in the B+Tree nodes a header with the list size, both in terms of integer count, and block count. The implementations further put in the B+Tree, and in association with the header, a block called working area, actually the last block of the inverse list storage. The union of the header and the (associated) working area is called a full header.

The implementations organize the secondary area in trees, with the root address (i.e., offset in the secondary area) stored in the header of the inverse list. The number of blocks in a tree node is fixed at database creation, and is supposed to be a power of 2, between 1 and the ratio of the page size by the block size. A page may thus contain a fixed number of nodes, and each node is stored on a single page.

The branching factor of the tree depends on the node size. The internal nodes have the same fixed size as the leaves, but store addresses (offsets in file) instead of blocks. The depth of the tree is function of the block count (and node size). All leaves are at the same distance from the root, thereby the tree stays balanced, and grows from the root, like a BTree.

Figure 3A:
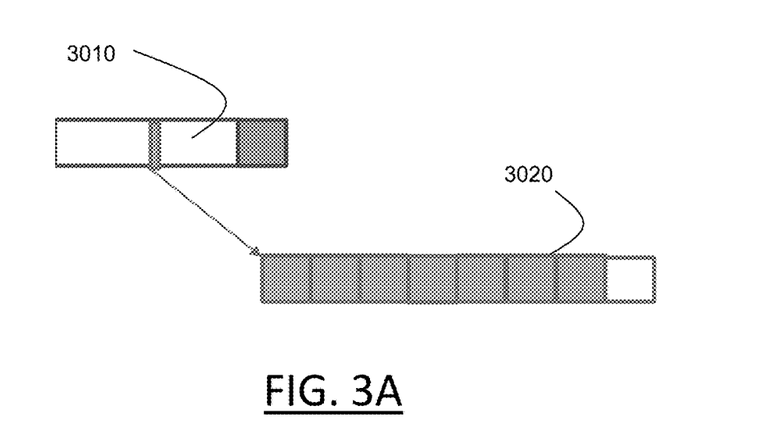
FIGS. 3A and 3B show schematic examples of a header of an inverse list according to the method.
Figure 3B:
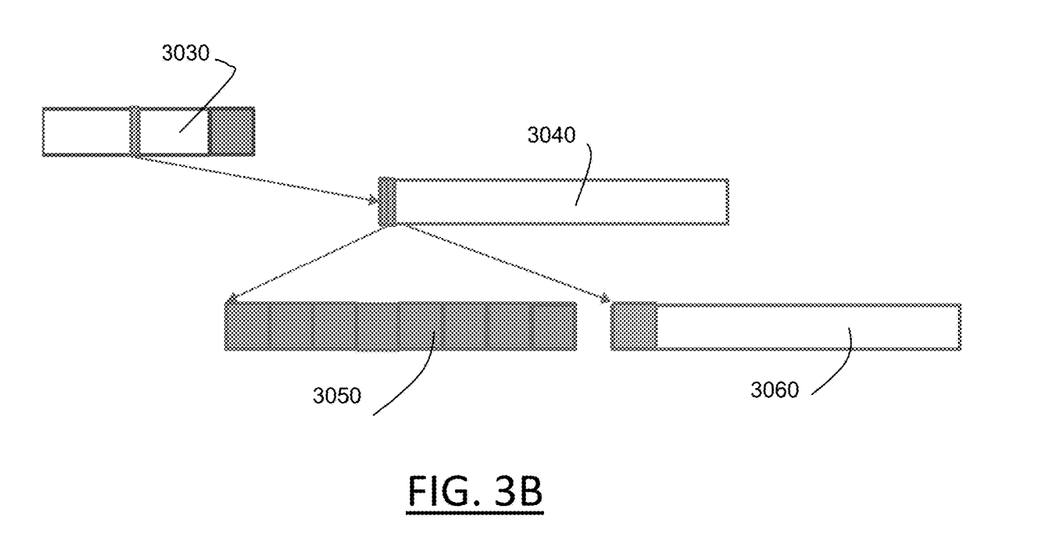

According to the implementations, the second data structure is a tree. For such cases, FIG. 3A presents a header 3010 pointing a leaf 3020 in the secondary area with seven blocks. FIG. 3B presents a header 3030 pointing an intermediate node 3040 with two pointers to leaves 3050 and 3060. The leaf 3050 is already full the leaf 3060 is other incomplete. The tree depth increases when the intermediate node 3060 is complete, with 32 pointers to complete leaves.

Write Amplification Control

A secondary file page that contains only leaves of inverse list trees is kept unmodified once all leaves are full. The smaller the number of blocks in leaves, the most probable modification of the database touches a small number of not-full leaves. However, a bigger leaves' size means accessing the full inverse list requires reading less pages. The implementations set the block count in tree leaves at 8 blocks per leaf after some experiments to tradeoff between accessing bigger number of not-full leaves and reading more pages.

Query Execution Overview

The following experiment demonstrates the usage of inverse list of trigrams on RDF Literals. The experiment imported the CHEMBL dataset and performed the SPARQL query:

```
PREFIX rdf: <www.w3.org/1999/02/22-rdf-syntax-ns#>
PREFIX rdfs: <www.w3.org/2000/01/rdf-schema#>
SELECT ?s ?o
WHERE {
  ?s rdfs:label ?o
  FILTER CONTAINS(?o, "Aspirin")
}
```

The query results are as the following Table 3:

TABLE 3

|  | size on disk | elapsed query time |
|---|---|---|
| no inversed list | 11.8 GB | 13.8 s |
| with inversed list | 13.9 GB | 9.8 ms |

Without inversed lists, the query may perform an extraction of all triples with rdfs:label predicate (with a complexity linear in the size of the predicate), and filter those with a literal object matching the filter. Alternatively, without inversed list the query may filter all literals matching the filter (with a complexity linear in the size of the dictionary), then retrieve the triples with rdfs:label predicate and the precise subject(s). In either case, the complexity is linear on the size of a big part of the dataset.

With inverse list, we extract information on how many literals contains each of the desired trigram (in the example: 'Asp', 'spi', 'pir', 'iri', 'rin'), get the smallest list, and easily obtain an algorithmic complexity linear on the size of the smallest trigram list.

The invention claimed is:

1. A computer-implemented method for updating one or more inversed lists of a read/write graph database, each inversed list being associated with a trigram comprised in a literal value, the method comprising:
    obtaining a dictionary encoder including a set of literal values and a set of IDs, each literal value being associated with an ID; and
    for each literal value:
        identifying trigrams composing the literal value; and
    for each identified trigram, and in a first data structure:
        updating a header of the inversed list associated with the identified trigram, and
        updating a designated block which includes a representation of the ID of the literal value having the trigram, thereby updating the inversed list associated to the identified trigram.

2. The computer-implemented method of claim 1 further comprising, upon meeting a criterion:
    updating a representation of the ID of the literal value in a second data structure, the second data structure being associated with the header; and
    initializing the designated block.

3. The computer-implemented method of claim 2, wherein the criterion is met when the designated block is full.

4. The computer-implemented method of claim 3, wherein, the second data structure is a tree, and the method further comprises, upon the updating of the representation of the ID of the literal value in a second data structure:
    updating a root address of the tree in the header.

5. The computer-implemented method of claim 3, wherein the second data structure is a tree, the updates representation of the ID of the literal value in the second data structure comprising:
    one or more blocks, each block being a set of eight 32-bit words.

6. The computer-implemented method of claim 2, wherein the second data structure is a tree, and the method further comprises, upon the updating of the representation of the ID of the literal value in a second data structure:
    updating a root address of the tree in the header.

7. The computer-implemented method of claim 2, wherein the second data structure is a tree, the updated representation of the ID of the literal value in the second data structure comprising:
    one or more blocks, each block being a set of eight 32-bit words.

8. The computer-implemented method of claim 1, wherein the first data structure is any associative data structure.

9. The computer-implemented method of claim 8, wherein the first data structure is a tree.

10. The computer-implemented method of claim 1, wherein the first data structure is a B+Tree, and
    wherein the updating of a representation of the ID of the literal value comprises:
    updating a reference of the ID in an internal node of the B+Tree, and
    updating the ID in a leaf of the B+Tree.

11. The computer-implemented method of claim 1, wherein the designated block of the first data structure is a set of eight 32-bit words.

12. The computer-implemented method of claim 11, wherein each of the set of eight 32-bit words is configured according to one of following patterns:
    16×2 bits integers,
    8×3 bits then 2×4 bits,
    2×4 bits then 8×3 bits,
    8×4 bits,
    4×5 bits then 2×6 bits,
    2×6 bits then 4×5 bits,
    3×6 bits then 2×7 bits,
    2×7 bits then 3×6 bits,
    4×8 bits,
    1×10 bits then 2×11 bits,
    2×11 bits then 1×10 bits,
    1×8 bits then 1×24 bits,
    2×16 bits,
    1×24 bits then 1×8 bits, or
    1×32 bits.

13. The computer-implemented method of claim 12, wherein a first word of the set includes data of one or more of following:
    an indicator if the designated block is full or not,
    an indicator of a next word to be filled, and/or
    an indicator of a pattern for each word.

14. The computer-implemented method of claim 1, wherein the representation of the ID of the literal value indicates a difference between:
    a first ID of a first literal value including the identified trigram, and
    a second ID of a second literal value including the identified trigram.

15. A non-transitory computer readable having stored thereon a computer program having instructions which, when executed by a computer, cause the computer to carry out the method of 1.

16. A computer-implemented method for answering a query, the method comprising:
    obtaining a query by a query engine, the query containing at least one filter for a literal value;
    obtaining one or more updated inversed lists, the one or more updated inversed lists being obtained according to the computer-implemented method of claim 1, the one or more obtained inversed lists being associated to respective one or more trigrams composing the literal value of the filter; and answering the obtained query using a subset of the one or more obtained inversed lists.

17. The computer-implemented method of claim 16, wherein the subset of the one more of the one or more obtained inversed lists are a subset of a minimal cardinality among the one or more obtained inversed lists.

18. A non-transitory computer readable having stored thereon a computer program having instructions which, when executed by a computer, cause the computer to carry out the method of 16.

19. A read/write graph database comprising:
- at least one inversed list, each inversed list of the database being associated with a trigram comprised in a literal value, the at least one inversed list of the database being updated by a processor being configured to update one or more inversed lists of a read/write graph database, each inversed list being associated with a trigram comprised in a literal value, the processor being configured to:
- obtain a dictionary encoder including a set of literal values and a set of IDs, each literal value being associated with an ID; and
- for each literal value:
  - identify trigrams composing the literal value; and
  - for each identified trigram, and in a first data structure:
    - update a header of the inversed list associated with the identified trigram, and
    - update a designated block which includes a representation of the ID of the literal value having the trigram, thereby updating the inversed list associated to the identified trigram.

20. An apparatus for updating one or more inversed lists of a read/write graph database, each inversed list being associated with a trigram comprised in a literal value, the apparatus comprising:
- processing circuitry configured to:
  - obtain a dictionary encoder including a set of literal values and a set of IDs, each literal value being associated with an ID; and
- for each literal value:
  - identify trigrams composing the literal value; and
  - for each identified trigram, and in a first data structure:
    - update a header of the inversed list associated with the identified trigram, and
    - update a designated block which includes a representation of the ID of the literal value having the trigram, thereby updating the inversed list associated to the identified trigram.

* * * * *